United States Patent
Kang et al.

(10) Patent No.: US 10,012,853 B2
(45) Date of Patent: Jul. 3, 2018

(54) FLEXIBLE SUBSTRATE BONDING METHOD

(71) Applicant: Corning Precision Materials Co., Ltd., Chungcheongnam-do (KR)

(72) Inventors: Gyung Soo Kang, Chungcheongnam-do (KR); Bo Kyung Kong, Chungcheongnam-do (KR); Eun Heui Choi, Chungcheongnam-do (KR); Young Seon Park, Chungcheongnam-do (KR); Woo Jin Lee, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 171 days.

(21) Appl. No.: 15/037,582

(22) PCT Filed: Nov. 18, 2014

(86) PCT No.: PCT/KR2014/011085
§ 371 (c)(1),
(2) Date: May 18, 2016

(87) PCT Pub. No.: WO2015/072819
PCT Pub. Date: May 21, 2015

(65) Prior Publication Data
US 2016/0274406 A1    Sep. 22, 2016

(30) Foreign Application Priority Data
Nov. 18, 2013    (KR) .......................... 10-2013-0139693

(51) Int. Cl.
*G02F 1/1333*    (2006.01)
*G02F 1/13*    (2006.01)
(Continued)

(52) U.S. Cl.
CPC ...... *G02F 1/133305* (2013.01); *B32B 37/003* (2013.01); *B32B 37/1009* (2013.01);
(Continued)

(58) Field of Classification Search
CPC ............. G02F 1/133305; G02F 1/1303; G02F 1/133528; B44C 1/1708; B44C 1/172;
(Continued)

(56) References Cited

U.S. PATENT DOCUMENTS 5,720,847 A  *  2/1998  Nagate .................. B29C 65/10
                                                         156/497
2004/0095546 A1    5/2004  Lee et al.
(Continued)

FOREIGN PATENT DOCUMENTS

JP    2006293154 A    10/2006
KR    20060059605 A    6/2006
(Continued)

OTHER PUBLICATIONS

International Search Report for Application No. PCT/KR2014/011085 dated Dec. 23, 2014.

*Primary Examiner* — Carson Gross
(74) *Attorney, Agent, or Firm* — Lerner, David, Littenberg, Krumholz & Mentlik, LLP

(57) ABSTRACT

The present invention relates to a flexible substrate bonding method and, more particularly, to a bonding method for bonding a flexible substrate to a carrier substrate in order to facilitate handling of the flexible substrate. To this end, the present invention provides a flexible substrate bonding method comprising: a substrate preparation step for preparing a carrier substrate and a flexible substrate; and a bonding step for bonding the carrier substrate to the flexible substrate, which rotates by being wound around a rotation roll, while moving the carrier substrate by a transfer unit, wherein
(Continued)

the bonding step includes bringing one edge of the flexible substrate into contact with the carrier substrate, and then gradually bonding the flexible substrate to the carrier substrate in a direction from one side to the other side.

7 Claims, 4 Drawing Sheets

(51) Int. Cl.
      *B32B 37/10*       (2006.01)
      *B32B 37/14*       (2006.01)
      *B32B 37/00*       (2006.01)
      *B32B 37/18*       (2006.01)
      *B65H 29/24*       (2006.01)
      *B65H 20/12*       (2006.01)
      *B65H 3/10*       (2006.01)
      *G02F 1/1339*       (2006.01)

(52) U.S. Cl.
    CPC .......... B32B 37/1018 (2013.01); B32B 37/14 (2013.01); B32B 37/144 (2013.01); B32B 37/18 (2013.01); G02F 1/1303 (2013.01); *B32B 2037/1072* (2013.01); *B32B 2307/546* (2013.01); *B32B 2457/202* (2013.01); *B65H 3/10* (2013.01); *B65H 20/12* (2013.01); *B65H 29/243* (2013.01); *G02F 1/1339* (2013.01)

(58) Field of Classification Search
    CPC ..... B44C 1/1741; B44C 1/1754; B65H 5/226; B65H 5/228; B65H 3/10; B65H 20/12; B65H 29/243; B32B 37/003; B32B 37/0053; B32B 37/10; B32B 37/1009; B32B 2037/1072; B32B 2457/20–2457/208; B29C 2043/3422
    USPC .................................. 156/87, 230, 285, 497
    See application file for complete search history.

(56) References Cited

U.S. PATENT DOCUMENTS

| | | | |
|---|---|---|---|
| 2009/0002913 A1* | 1/2009 | Naim | ................ H01L 21/67109 361/234 |
| 2014/0096904 A1* | 4/2014 | Gim | ........................ B32B 37/10 156/285 |
| 2016/0083282 A1* | 3/2016 | Jouanno | ................ B32B 17/061 156/102 |

FOREIGN PATENT DOCUMENTS

| | | |
|---|---|---|
| KR | 100652051 B1 | 11/2006 |
| KR | 20070103162 A | 10/2007 |
| KR | 20120113873 A | 10/2012 |

* cited by examiner

TFT/CF processing → Bonding of upper and lower substrates → Separation/removal of carrier substrate (a)　　　　　　　　　　　(b)

FLEXIBLE SUBSTRATE BONDING METHOD

BACKGROUND OF THE INVENTION

Field of the Invention

The present invention relates to a bonding method for a flexible substrate, and more particularly, to a method of bonding a flexible substrate to a carrier substrate in order to facilitate handling of the flexible substrate.

Description of Related Art

In response to the advent of the information society, there is increasing demand for high-performance displays for displaying various forms of information, such as images or graphic characters, in order to rapidly transfer various types of information. According to such demand, the display industry has shown rapid recent growth.

In particular, interest in flat panel displays (FPDs), such as liquid crystal displays (LCDs), plasma display panels (PDPs) and organic light-emitting displays (OLEDs), is rapidly increasing, since such displays have a large size and a thin profile and are relatively lightweight.

Due to the continuously increasing demand for thin lightweight FPDs, flexible substrates having a thickness of 2 mm or less have recently been developed and have been employed in the industry.

However, it is somewhat difficult to transport or process such a thin substrate alone, since the thin substrate may be damaged or sag during transportation or processing thereof, due to the thinness thereof. The thin substrate is transported and deposited after being bonded to a carrier substrate supporting the thin substrate. The carrier substrate is separated from the thin substrate after the completion of the transportation and deposition processes for the thin substrate.

FIG. 1 is a conceptual view illustrating the process of fabricating an LCD module using a thin substrate bonded to a carrier substrate. As illustrated in FIG. 1, the LCD module may be fabricated by forming a color filter (CF) and a thin-film transistor (TFT) array on a thin substrate bonded to a carrier substrate and subsequently separating the carrier substrate from the thin substrate.

In order to fabricate a high-quality display module using the thin substrate bonded to the carrier substrate, high bonding quality between the carrier substrate and the thin substrate is required. That is, it is necessary that no trapped air or particles be present in the bonding surface of either the carrier substrate or the thin substrate.

RELATED ART DOCUMENT

Patent Document 1: Korean Patent Publication Application No. 10-2007-0103162 (Oct. 23, 2007)

BRIEF SUMMARY OF THE INVENTION

Various aspects of the present invention provide a bonding method for a flexible substrate able to reduce the amount of air trapped in a bonding surface of either a carrier substrate or a flexible substrate.

In an aspect of the present invention, provided is a bonding method for a flexible substrate including: preparing a flexible substrate and a carrier substrate; and bonding the flexible substrate wound on a rotating roller onto the carrier substrate while moving the carrier substrate using a transportation unit. The bonding operation includes bringing one edge portion of the flexible substrate into contact with the carrier substrate, and gradually bonding the flexible substrate onto the carrier substrate in the direction from the one edge portion toward the other edge portion.

In another aspect of the present invention, provided is a bonding method for a flexible substrate including: preparing a flexible substrate and a carrier substrate; and bonding the flexible substrate onto the carrier substrate. The bonding operation includes bringing one edge portion of the flexible substrate into contact with the carrier substrate, and gradually bonding the flexible substrate onto the carrier substrate in the direction from the one edge portion toward the other edge portion while blowing air onto the flexible substrate in the direction from the one edge portion toward the other edge portion from above the flexible substrate.

According to the present invention as set forth above, it is possible to reduce the amount of air trapped in the bonding surface of either the flexible substrate or the carrier substrate by gradually bonding the flexible substrate to the carrier substrate.

In addition, since the bonding operation is carried out in a vacuum, it is possible to reduce the expansion of trapped air between the flexible substrate and the carrier substrate even in the case in which the flexible substrate bonded to the carrier substrate is subjected to post processing in a vacuum atmosphere.

DETAILED DESCRIPTION OF THE INVENTION

Figure 1:
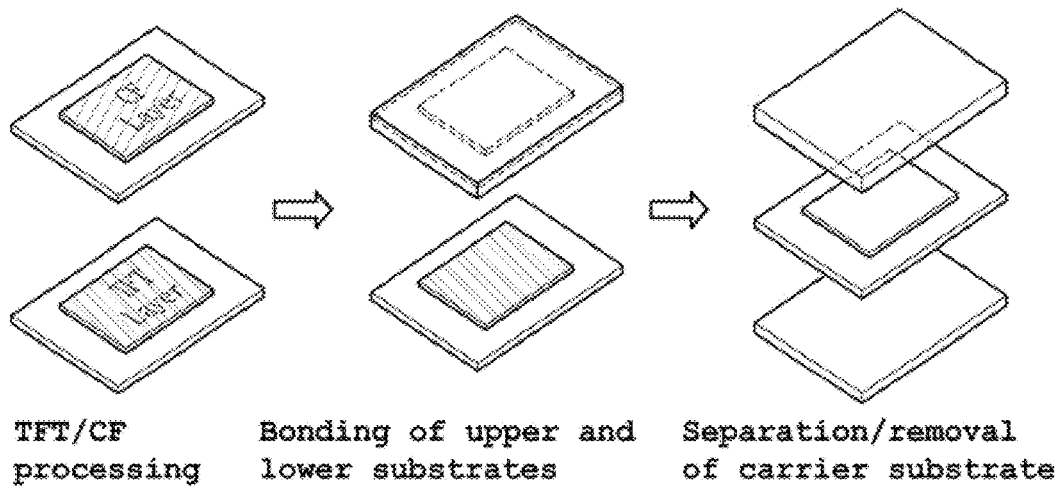
FIG. 1 is a conceptual view illustrating the process of fabricating an LCD module using a thin substrate bonded to a carrier substrate.

Reference will now be made in detail to a bonding method for a flexible substrate according to the present invention, embodiments of which are illustrated in the accompanying drawings and described below, so that a person skilled in the art to which the present invention relates could easily put the present invention into practice.

Throughout this document, reference should be made to the drawings, in which the same reference numerals and symbols are used throughout the different drawings to designate the same or similar components. In the following description of the present invention, detailed descriptions of known functions and components incorporated herein will be omitted in the case that the subject matter of the present invention is rendered unclear.

Figure 2:
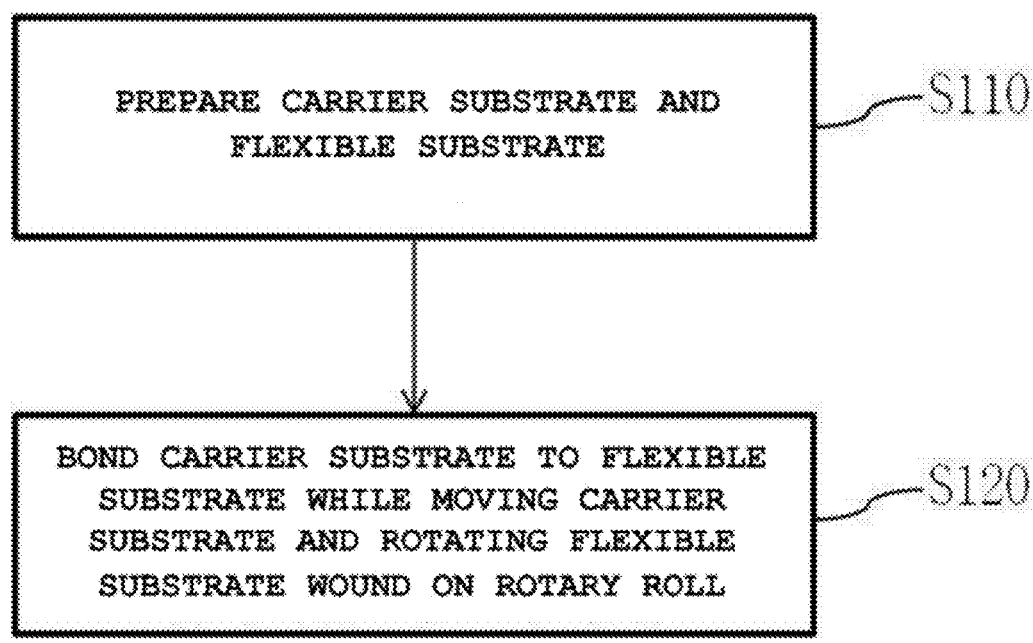
FIG. 2 is a schematic flowchart illustrating a bonding method for a flexible substrate according to a first exemplary embodiment of the present invention.

FIG. 2 is a schematic flowchart illustrating a bonding method for a flexible substrate according to a first exemplary embodiment of the present invention.

As illustrated in FIG. 2, the bonding method for a flexible substrate according to the first exemplary embodiment of the present invention includes a substrate preparation operation S110 and a bonding operation S120.

First, at S110, a flexible substrate and a carrier substrate are prepared in order to bond the flexible substrate to the carrier substrate.

The carrier substrate is a base substrate to be bonded to the flexible substrate in order to facilitate handling of the flexible substrate. The carrier substrate may be formed of glass. The periphery of one surface of the carrier substrate to be bonded to the corresponding surface of the flexible substrate may be chamfered in order to facilitate the future separation of the carrier substrate from the flexible substrate to which the carrier substrate is bonded. Specifically, the periphery of one surface of the carrier substrate to be bonded to the corresponding surface of the flexible substrate is cut at an incline in order to form a recess between the carrier substrate and the flexible substrate bonded to the carrier substrate. Afterwards, the flexible substrate can be more easily separated from the carrier substrate using the recess.

The flexible substrate refers to a substrate that is flexible or bendable or may be wound on a roller. The flexible substrate may be a thin glass substrate having a thickness of 0.2 mm. The flexible substrate may be used as a backing on which a color filter or a thin-film transistor (TFT) array is formed.

Afterwards, at S120, the carrier substrate is transported using a carrier and is bonded to the flexible substrate wound on a roller that is rotating. Here, the operation of bonding the carrier substrate to the flexible substrate includes bringing one edge portion of the flexible substrate into contact with the carrier substrate and gradually bonding the flexible substrate to the carrier substrate in the direction from one edge portion toward the other edge portion that faces one edge portion.

Specifically, as the carrier substrate is moved by the transportation unit, the carrier substrate comes into contact with one edge portion of the flexible substrate wound on the rotating roller in a position below the rotating roller. As the carrier substrate is further moved and the roller rotates, the flexible substrate is gradually bonded to the carrier substrate in the direction from one edge portion to the other edge portion of the flexible substrate. The carrier substrate and the flexible substrate are bonded to each other due to Van der Waals force and/or capillary action that occur on boundary surfaces as the carrier substrate and the flexible substrate come into contact with each other.

The transportation unit serves to move the carrier substrate toward the flexible substrate wound on the rotating roller, and may be implemented as a variety of devices such as a conveyor belt, a transportation roller or the like.

The roller is disposed above the transportation unit, and serves to rotate the flexible substrate wound thereon.

The roller rotates using a separate rotary motor (not shown). The rate of revolutions of the roller must be synchronized with the speed at which the carrier substrate is moved by the transportation unit. In addition, the roller may be movable upwardly and downwardly.

As described above, the flexible substrate is gradually bonded to the carrier substrate in the direction from one edge portion toward the other edge portion of the flexible substrate. This can consequently prevent air from being trapped in the bonding surface of either the flexible substrate or the carrier substrate.

Figure 3:
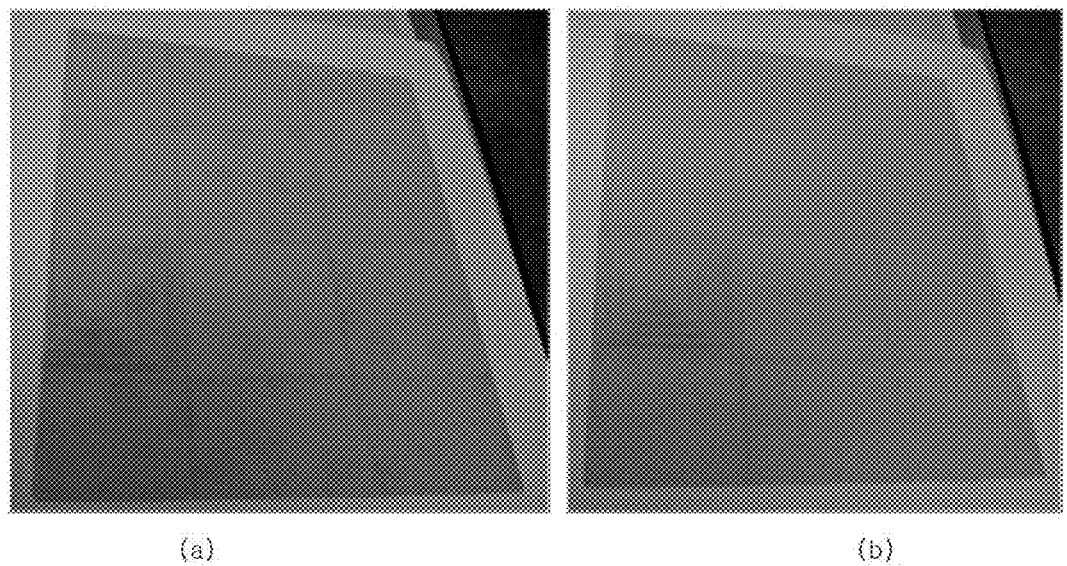
FIG. 3 illustrates images of a comparative example and an inventive example, in each of which a flexible substrate is bonded to a carrier substrate.

FIG. 3 illustrates (a) an image of a comparative example in which a flexible substrate is manually bonded to a carrier substrate by a method of the related art and (b) an image of an inventive example in which a flexible substrate is manually bonded to a carrier substrate by a method according to the first exemplary embodiment of the present invention. Comparing part (a) with part (b) of FIG. 3, it will be appreciated that the amount of air trapped in the bonding surface of either the flexible substrate or the carrier substrate was significantly reduced when the flexible and carrier substrates were bonded to each other by the method according to the first exemplary embodiment of the present invention rather than by the method of the related art.

Figure 4:
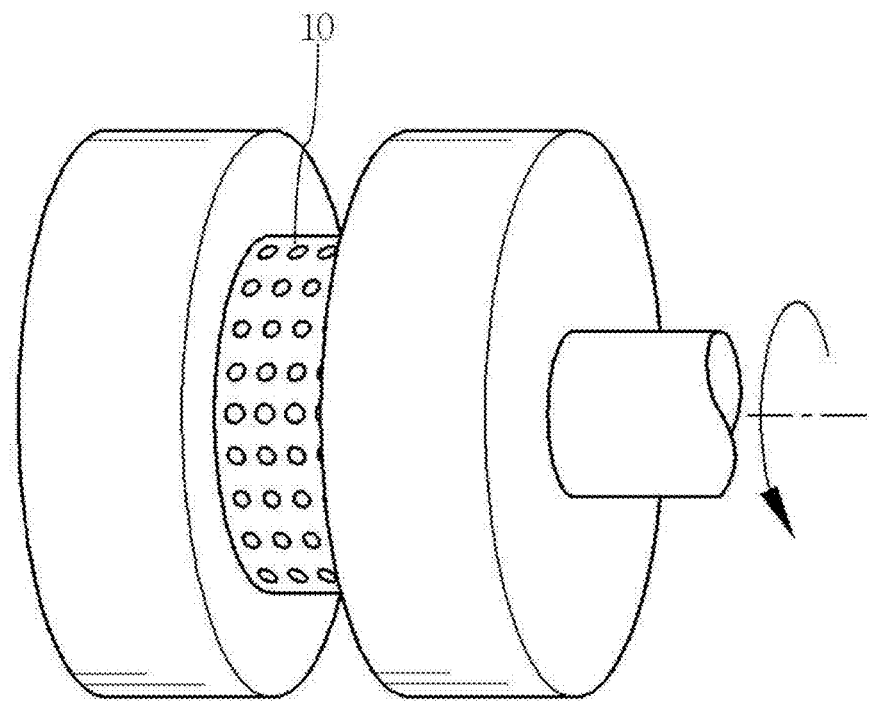
FIG. 4 and FIG. 5 are schematic perspective views illustrating a rotary roller according to the first exemplary embodiment of the present invention.
Figure 5:
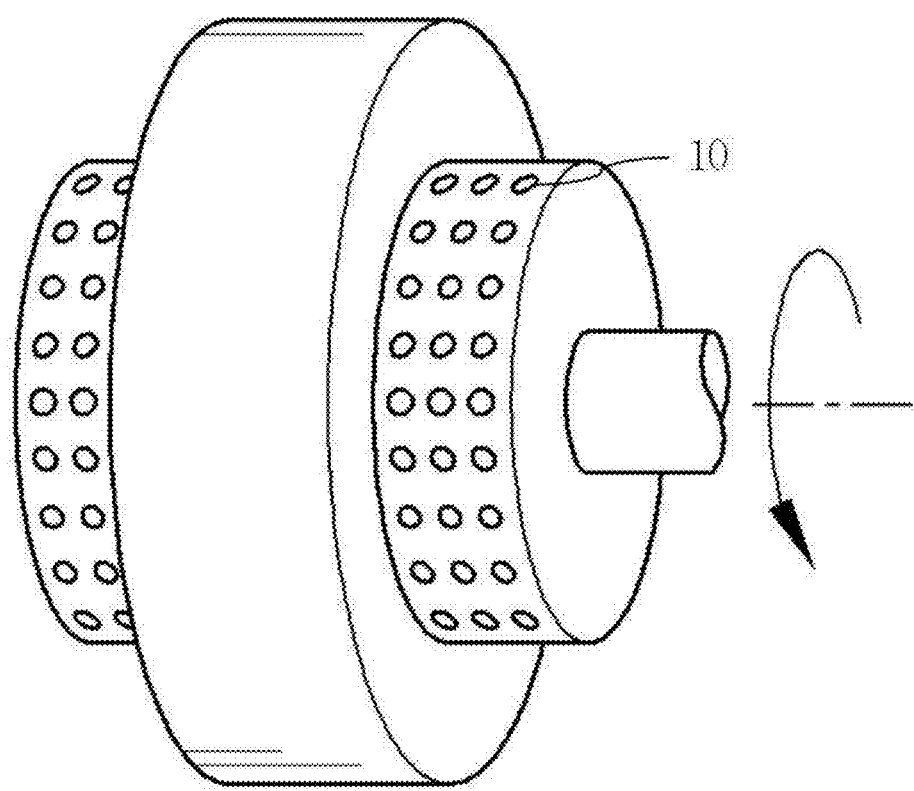

As illustrated in FIG. 4 and FIG. 5, the roller employed in the first exemplary embodiment of the present invention may have concave portions on the outer circumference of the body thereof.

The concave portions may be formed on the central portion of the roller 10, as illustrated in FIG. 4, or on opposite end portions of the roller, as illustrated in FIG. 5.

Since the concave portions are formed on the outer circumference of the roller that rotates the flexible substrate wound thereon, it is possible to minimize the area by which the flexible substrate and the roller adjoin each other, thereby reducing damage, such as scratches, to the flexible substrate caused by the roller.

Considering the minimization of the area by which the flexible substrate and the roller adjoin each other and the reliable support of the flexible substrate by the roller, it is preferable that the width of the convex portion of the roller that adjoins the flexible substrate ranges ⅕ to ⅓ of the width of the flexible substrate.

In addition, a plurality of air nozzles 10 are formed in the concave portions of the roller.

When the flexible substrate comes into contact with the carrier substrate, the plurality of the air nozzles 10 blow air onto the portions of the flexible substrate that are unsupported by the roller, such that the flexible substrate firmly adjoins the carrier substrate.

In addition, a plurality of electrostatic discharge (ESD) chucks (not shown) able to generate static electricity may be provided on the outer circumference of the roller.

It is preferable that the plurality of ESD chucks are disposed at regular distances in order to generate static electricity on the outer circumference of the roller at regular distances.

The plurality of ESD chucks generate static electricity in response to power applied thereto, such that the flexible substrate wound on the roller may be more firmly fixed to the roller.

In addition, the bonding operation S120 may include discharging static electricity applied to the portion of the flexible substrate to be bonded to the carrier substrate before the flexible substrate is bonded to the carrier substrate, such that the flexible substrate and the carrier substrate may be easily bonded to each other. Specifically, before the flexible substrate is bonded to the carrier substrate, the operations of the plurality of ESD chucks generating static electricity and applying the static electricity to corresponding portions of the flexible substrate are sequentially stopped in order of the corresponding portions of the flexible substrate that are to be bonded to the carrier substrate, such that the flexible substrate can be easily attached to the carrier substrate.

Figure 6:
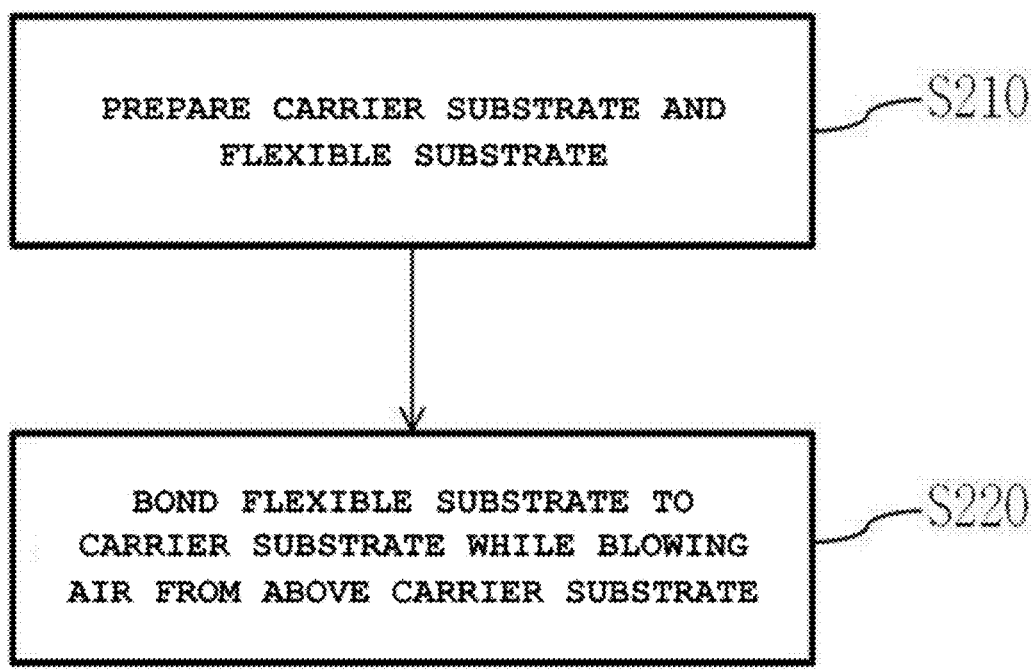
FIG. 6 is a schematic flowchart illustrating a bonding method for a flexible substrate according to a second exemplary embodiment of the present invention.

FIG. 6 is a schematic flowchart illustrating a bonding method for a flexible substrate according to a second exemplary embodiment of the present invention.

As illustrated in FIG. 6, the bonding method for a flexible substrate according to the second exemplary embodiment of the present invention includes a substrate preparation operation S210 and a bonding operation S220.

First, at S210, a carrier substrate and a flexible substrate are prepared in order to bond the flexible substrate to the carrier substrate, described above.

A description of the substrate preparation operation S210 will be omitted since the substrate preparation operation S210 is identical to the above-described substrate preparation operation S110 of the first exemplary embodiment.

Afterwards, at S220, one edge portion of the flexible substrate is brought into contact with the carrier substrate, and the flexible substrate is gradually bonded to the carrier substrate in the direction from one edge portion toward the other edge portion by blowing air onto the flexible substrate in the direction from one edge portion toward the other edge portion from above the flexible substrate.

Specifically, after only one edge portion of the flexible substrate is brought into contact with the carrier substrate, air is blown onto the flexible substrate in the direction from one edge portion toward the other edge portion from above the flexible substrate, such that the flexible substrate is gradually bonded to the carrier substrate in the direction from one edge portion toward the other edge portion of the flexible substrate. Here, the operation of blowing air is carried out using an air knife.

Accordingly, it is possible to prevent air from being trapped in the bonding surface of either the flexible substrate or the carrier substrate by gradually bonding the flexible substrate to the carrier substrate using the pressure of air blown from above the flexible substrate.

Figure 7:
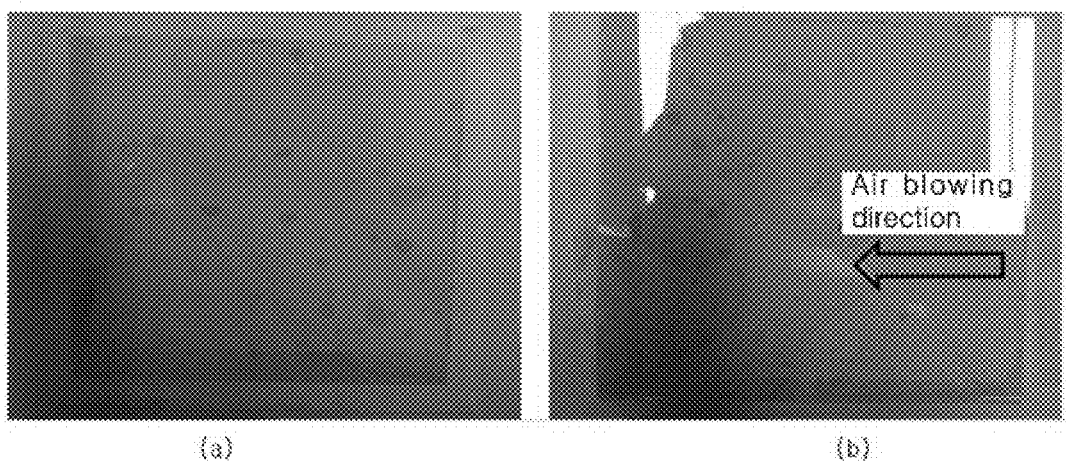
FIG. 7 illustrates images of a comparative example and an inventive example, in each of which a flexible substrate is bonded to a carrier substrate.

FIG. 7 illustrates (a) an image of a comparative example in which a flexible substrate is manually bonded to a carrier substrate by a bonding method of the related art and (b) an image of an inventive example in which a flexible substrate is bonded to a carrier substrate according to the second exemplary embodiment of the present invention. Comparing part (a) with part (b) of FIG. 7, it will be appreciated that the amount of air trapped in the bonding surface of either the flexible substrate or the carrier substrate was significantly reduced when the flexible and carrier substrates were bonded to each other by the method according to the second exemplary embodiment of the invention rather than by the manual process of the related art.

In the method of bonding a flexible substrate to a carrier substrate according to either the first or second exemplary embodiment of the invention, the bonding operation S120/S120 may be carried out in a vacuum atmosphere.

Since the bonding operation S120/S120 is carried out in a vacuum atmosphere, it is possible to prevent air trapped between the carrier substrate and the flexible substrate from expanding even in the case where the flexible substrate bonded to the carrier substrate is subjected to vacuum atmosphere processing.

For example, a process of forming a color filter or a thin-film transistor (TFT) array on a flexible substrate is carried out in a vacuum atmosphere. When this process is carried out in the vacuum atmosphere after bonding the flexible substrate and the carrier substrate to each other, the volume of air trapped between the carrier substrate and the flexible substrate expands about $10^6$ times by the formula: $V2=(P1)/(P2)^{(1/r)}*V1$, where V indicates a volume, P indicates a pressure, and r indicates a specific heat ratio. The expansion in the volume of the trapped air breaks the bonding between the carrier substrate and the flexible substrate, such that, for example, the process of forming the color filter or the TFT array on the flexible substrate cannot be carried out. In contrast, when the carrier substrate and the flexible substrate are bonded to each other in a vacuum atmosphere with a vacuum pressure of $10^{-2}$ torr, even in the case where the a process is carried out in a vacuum atmosphere with a vacuum pressure of $10^{-6}$ torr, the volume of air trapped between the carrier substrate and the flexible substrate expands merely about $10^3$ times.

It is preferable that the bonding operation is carried out in a vacuum atmosphere with a vacuum pressure ranging from $1*10^{-3}$ to $1*10^{-2}$ torr.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A bonding method for a flexible substrate comprising:
    preparing a flexible substrate and a carrier substrate; and
    bonding the flexible substrate wound on a rotating roller onto the carrier substrate while moving the carrier substrate using a transportation unit, wherein the roller comprises a concave portion on an outer surface of the roller,
    wherein bonding the flexible substrate onto the carrier substrate comprises bringing one edge portion of the flexible substrate into contact with the carrier substrate, and gradually bonding the flexible substrate onto the carrier substrate in a direction from the one edge portion toward a second edge portion.

2. The bonding method according to claim 1, wherein bonding the flexible substrate onto the carrier substrate is carried out in a vacuum atmosphere.

3. The bonding method according to claim 2, wherein a vacuum pressure of the vacuum atmosphere ranges from $1*10^{-3}$ to $1*10^{-2}$ torr.

4. The bonding method according to claim 1, wherein a plurality of air nozzles are provided in the concave portion of the roller.

5. The bonding method according to claim 4, wherein the concave portion is formed at a central location or both end locations of the roller.

6. The bonding method according to claim 4, wherein a width of a convex portion of the roller ranges from ⅕ to ⅓ of a width of the flexible substrate.

7. The bonding method according to claim 1, wherein a plurality of electrostatic discharge chucks to generate static electricity are provided on an outer surface of the roller.

* * * * *